United States Patent [19]

Musachio

[11] Patent Number: 5,045,646
[45] Date of Patent: Sep. 3, 1991

[54] ELECTRICAL VEHICLE TRANSPORTATION SYSTEM

[76] Inventor: Nicholas R. Musachio, 862 W. Iowa, St. Paul, Minn. 55117

[21] Appl. No.: 383,036

[22] Filed: Jul. 20, 1989

[51] Int. Cl.$^5$ ............................................. B60L 9/00
[52] U.S. Cl. ........................................ 191/6; 191/18; 180/2.1
[58] Field of Search ............... 191/2, 3, 4, 6, 8, 14, 191/15, 17, 18, 29 DM, 47; 180/2.1

[56] References Cited

U.S. PATENT DOCUMENTS

| | | | |
|---|---|---|---|
| 1,859,343 | 5/1932 | Rouge | 191/49 |
| 3,637,956 | 1/1972 | Blackman | 180/2.1 X |
| 4,057,753 | 11/1977 | Perry et al. | 191/4 X |
| 4,129,203 | 12/1978 | Berman | 191/4 X |
| 4,139,071 | 2/1979 | Tackett | 180/2 R X |
| 4,476,947 | 10/1984 | Rynbrandt | 180/2.1 |
| 4,836,344 | 6/1989 | Bolger | 191/15 X |
| 4,892,980 | 1/1990 | Riley | 191/14 |

FOREIGN PATENT DOCUMENTS 2504061  8/1976  Fed. Rep. of Germany ........ 191/18

Primary Examiner—Robert J. Spar
Assistant Examiner—Scott L. Lowe
Attorney, Agent, or Firm—Kinney & Lange

[57] ABSTRACT

An electric vehicle transportation system. The system includes a roadway having a load bearing surface. The load bearing surface supports an electric power rail extending longitudinally on the roadway. The power rail is segmented and includes a plurality of longitudinally aligned, mutually electrically isolated portions. A power bus energizes selected portions of the rail. Energization is controlled by power switching controllers associated with each of the electrically isolated portions of the rail. Energization selection is effected in response to an actuation signal applied to a portion longitudinally displaced by a predetermined interval from the portion of the power rail associated with the controller which is connected to the controller by an actuation signal transmitting apparatus. Electric vehicles are adapted for operation on the roadway by being adapted to provide the actuation signal to a selected portion of the power rail and being further adapted to draw power from an energized portion of the power rail.

21 Claims, 3 Drawing Sheets

ELECTRICAL VEHICLE TRANSPORTATION SYSTEM

BACKGROUND OF THE INVENTION

1. Field of the Invention

The invention relates to electrical transportation systems providing an external power source for vehicles.

2. Description of the Prior Art

Electrically-powered vehicles have a long history. Electrically-powered pantograph trains are used for commuter passenger trains along heavily traveled routes on the east coast of the United States and in the Chicago metropolitan area. Subways and other light rail systems routinely use electrified third-rail systems. Electrically-powered automobiles and delivery vans are in use around major cities. Electrically powered golf carts, fork lift trucks and other such specialized vehicles also exist.

Electrical power offers numerous benefits as an energy source in transportation. In railroad locomotives, electric motors offer excellent low end torque, reliability and ease of maintenance. Diesel-electric locomotives use diesel engines to turn generators, which in turn supply electrical power to drive electric traction motors in order to gain these advantages. Still other advantages can be gained by the use of purely electric-powered vehicles. Examples of such advantages include reduced pollution output, reduced mechanical complexity and, where, the electrical power source is external, reduced weight.

Unfortunately, providing adequate electrical power to vehicles has proven difficult, expensive, or inconvenient, or all three of the above depending upon the application. Pure electrically-powered vehicles have conventionally used one of two sources of electrical power, on-board batteries or external sources such as trolleys. Batteries are inefficient stores of energy, particularly when compared to gasoline, which limit the relative range of vehicles using batteries. The batteries required by a vehicle for even limited ranges of 50 to 100 miles add considerably to the weight of the vehicle using them, adding inherent inefficiency to the vehicle. Providing external sources of power, such as trolley systems, has typically required a prohibitive capital investment and has limited the routing of vehicles.

Nonetheless, electrically powered transportation systems employing external power sources have been very successful where employed. Electrified rail systems have typically relied on external power. External electric power supplies such as overhead trolleys and third rail systems work well for railroads under certain conditions. However, overhead lines are extremely expensive and considered by many to be unsightly. In many environments overhead lines are exposed to possible damage from weather, accident and sabotage. Third rail systems work well but are inherently dangerous to pedestrians. None of these systems have proven economically viable for lightly traveled routes despite wide appreciation of the reduced pollution and reduced maintenance costs afforded by such systems.

Electrification of automobiles and other over the road motor vehicles has progressed even more slowly than in the railroad industry. In fact, electrification of automobiles has regressed since the beginning of the century when electric vehicles vied with internal combustion powered and external combustion powered vehicles for dominance on the highways. Practical electric automobiles have typically been supplied with energy from batteries. At best, batteries provide energy to travel about one hundred miles. The use of accessories such as heat, air conditioning, or headlights, greatly reduces even this limited range. The weight of the batteries themselves reduces the range, and space efficiency of automobiles so equipped. Frequent recharging of the batteries in such vehicles is unavoidable. In addition, many of the best batteries in terms of overall energy storage capability accept charging at a slow rate. This makes recharging a slow and tedious affair. Electrically-powered battery equipped automobiles have proven inconvenient compared to internal combustion powered motor vehicles.

Battery equipped vehicles compare very poorly in efficiency terms with electric vehicles energized by external electrical sources. For this reason numerous inventors have attempted to develop systems for delivering electrical power to over the road vehicles. Such systems have typically had the disadvantages of high initial capital cost, plus the additional handicap of overly limiting the maneuverability of the vehicles so powered. With the exception of trolley buses, practical electrically-powered motor vehicles have carried a heavy load of storage batteries as a power source. Guidance control of the trolley has also complicated use of external electrical power in cars.

U.S. Pat. No. 1,859,343, teaches an electric vehicle having electrically conductive tires. The conductive tires contact a series of conductors embedded in a roadway to complete an electric circuit between the embedded conductors and an overhead line which is engaged by a trolley. While this system allows limited maneuverability, it has the same basic limitations of any overhead trolley system.

U.S. Pat. No. 4,139,071 provides an electrified traffic lane having at least two spaced parallel contact assemblies mounted with their top surfaces flush with the road on each side of the vehicle. The contact assemblies each require a predetermined weight thereon to maintain electrical contact with the vehicle wheels. The vehicle employs electrically-conductive tires which are the pickup contact with the conductors for energization of electrical motors within the vehicle. This system presents a safety hazard to potential foot traffic along the roadway in that the system can be energized by any adequate weight and remains energized when a stationary weight is on a roadway electrical contact assembly.

U.S. Pat. No. 4,476,947 attempted to answer these difficulties. More particularly, the patent proposed a system directed to electrification of roadways and which provided vehicles adapted to receive power from such roadways for motive power and for recharging a minimal battery pack for powering the vehicle for off electrified roadway operation.

The patent proposes an electrified roadway which includes sets of paired, parallel, sectioned power rails. Each pair of power rails is aligned with a traffic lane of the roadway. Sections of each pair correspond to one another. Corresponding sections are energized with opposite polarity D.C. power according to the presence of a vehicle and demand by the vehicle for power. Vehicles are provided with a pair of trolleys, aligned perpendicular to the direction of movement of the vehicle. A powered guidance mechanism is provided for maintaining trolley tracking of the power rails.

SUMMARY OF THE INVENTION

The present invention is directed to an improved electrified transportation system providing substantially continuous, externally sourced electrical power to electrically-powered vehicles. A single power rail provides both electrical power and a return path to passing vehicles in contact with the rail. The power rail comprises a plurality of conductive segments, linearly aligned with one another and parallel to the direction of travel of motor vehicle along a motor vehicle route. Segment controllers supply power to selected segments upon demand by a passing vehicle. Conductive segments not receiving power are preferably grounded, or connected to the opposite polarity terminal of the power source.

Each vehicle has a pair of trolleys for making electrical contact with the power rail. The trolleys are substantially longitudinally aligned in the direction of movement of the vehicle and are brought in alignment with the power rail by bracketing the rail with the motor vehicle. The trolleys are spaced to insure electrical contact with different conductive segments of the power rail. A return trolley, typically the leading trolley in terms of movement of the motor vehicle, is in electrical contact with one or two conductive segments of the power rail at any given instant. This provides a ground return contact. The trailing trolley, or power trolley, is spaced from the ground contact to make electrical contact with a set of one or two segments exclusive of the segments in contact with the ground trolley. This electrical contact is the power contact.

A vehicle transmits a power on signal to the power rail through the ground trolley. This signal controls switching of a selected set of conductive segments to a power bus. The selected set of powered segments is spaced down the power rail from the ground trolley to exclude any segment in contact with the ground trolley. The powered segments include at least one, and preferably all, of the segments in contact with the power trolley. Insulated segments space the conductive segments from one another.

In roadway applications, trolley contact with the power rail is required for transmitting electrical power to each vehicle. Electrical contact must also be easily broken and reestablished to allow vehicles to easily leave and reenter trunk routes. The present invention provides two techniques of trolley guidance for electrical connection. The first technique provides a magnetically guided brush conductor directly aligned with a magnetic power rail. The second technique provides a vehicle wide brush or bar conductor for contacting the power rail upon simple bracketing of the power rail by a vehicle.

DETAILED DESCRIPTION OF THE PREFERRED EMBODIMENTS

Figure 1:
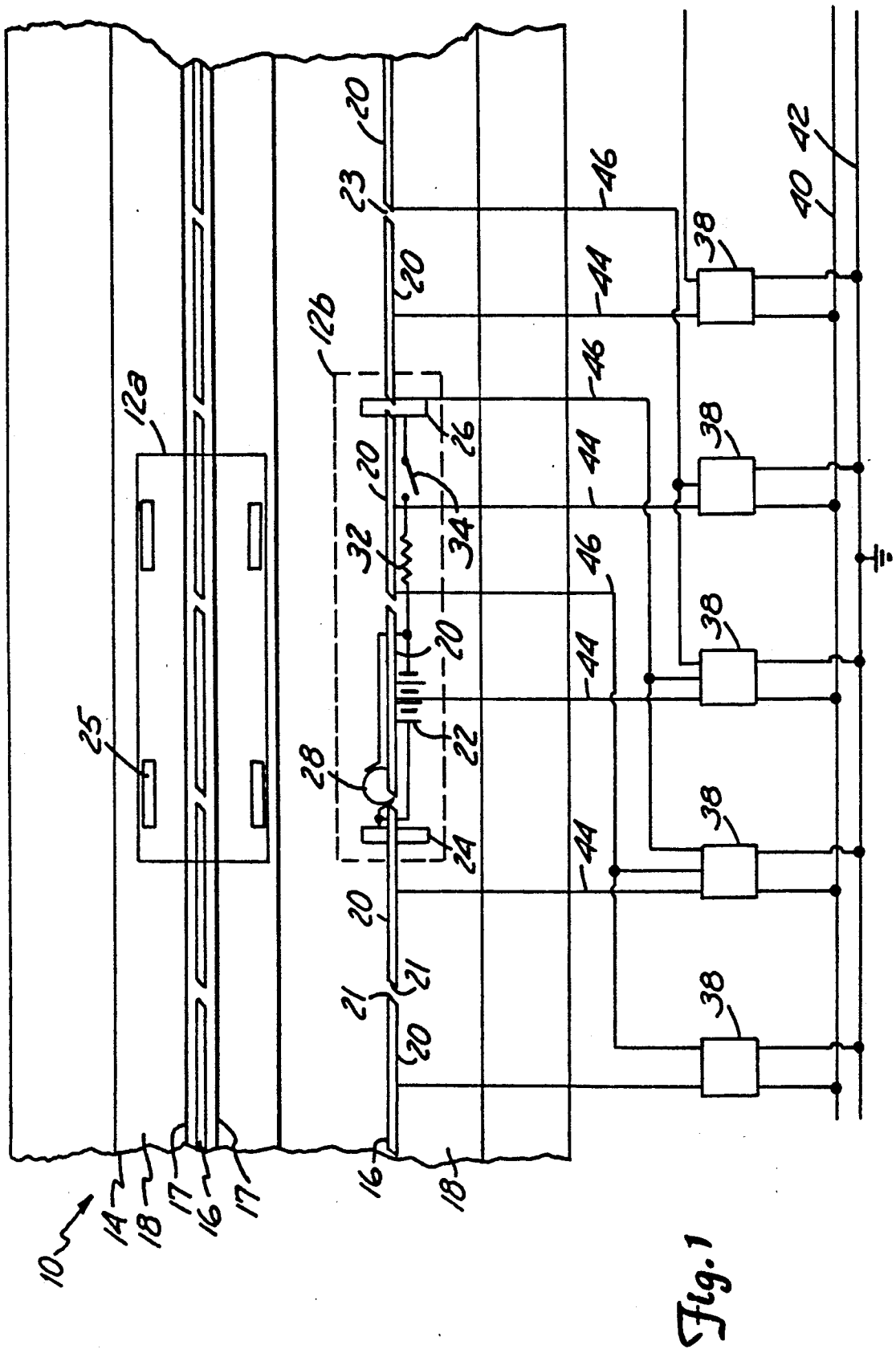
FIG. 1 is a top view and partial cross section of an electrified roadway.

The SHERT (Segmented, Hot, Electric, Rail, Transit) transportation system 10 of FIG. 1 provides an external power source for electrically-powered vehicles 12a and 12b on a multi-use, electrified roadway 14. Vehicle 12a illustrates the approximate alignment of a vehicle on roadway 14, while vehicle 12b is an equivalent circuit representation of such a vehicle. Electrified roadway 14 has a plurality of power rails 16, one of which is centered in each traffic lane 18. Each power rail 16 comprises a series of electrically conductive power rail segments or strips 20, which are aligned end to end to form the power rail. Electrically-powered vehicle 12b is in contact with at least two differing segments 20 of power rail 16 at any given moment, drawing power from one or two such segments while another, spaced segment or two provides a ground return.

Power rail segments 20 are shaped as parallelograms. Edges 21 between adjacent segments are canted with respect to the direction of alignment of the segments while being parallel to one another. Other power rail segment shapes are possible, the objective being continuous electrical contact between a trolley and power rail 16. In essence, a contact brush, elongated in a direction perpendicular to the direction of the rail, will come into electrical contact with each succeeding rail segment before it leaves its current rail segment (see, for example, current collector 26).

An insulating segment 23 electrically separates each power segment 20. Power segments 20, while normally grounded, are subject to selective energization through associated power switching controllers 38. Energization of individual power segments 20 is initiated by vehicle 12 as it moves along roadway 14. Each power rail 16 can be provided with adjacent drainage strips 17. Drainage strips 17 have conventional drainage pipes for preventing water from collecting over rail 16.

Each power segment 20 is connected to one power switching controller 38 by a power cable 44. In addition, each controller 38 is connected to a consecutive pair of different power segments 20 by actuation lines 46 from the respective pair of power segments. Application of an actuation signal to a power segment 20 results in transmission of the actuation signal to a consecutive pair of power switching controllers 38. Upon receipt of an actuation signal, a controller 38 connects its respective associated power segments 20 to power bus 40. In one preferred embodiment bus 40 provides D.C. power. Where vehicles 12 are provided with rectifiers, inverters, and A.C. tractor motors, such as proposed in part by Ford Motor Company for its ETX-II vehicle (see Report of the Assistant Secretary for Conservation and Renewable Energy, Office of Transportation Systems, U.S. Dept. of Energy for March 1988), A.C. power may be provided from the bus. Absent application of the actuation signal, controllers 38 connect their respective power segments 20 to ground bus 42. When grounded, power segments 20 are safe for pedestrian traffic. A description of an example of a protocol defining conditions under which a vehicle 12 generates actuation signals and the nature of those signals, appears in U.S. Pat. No. 4,476,947. Those skilled in the art will realize that actuation signals could also be detected by controllers 38 from power cables 44. An opposite polarity power bus would be substituted for ground bus 42.

Actuation signals are applied to the power segment 20 currently providing the ground return for a passing vehicle 12a or 12b. Power segments 20 energized in response to the actuation signals are spaced by a constant interval from the ground return power segment 20. In the preferred embodiment, the energized segments 20 are a consecutive pair of segments spaced by an interval of one intervening nonenergized segment 20 between the current ground return segment 20 and the closer energized segment 20. The interval can range from no intervening segments 20, provided the set of energized segments never overlaps the set of ground return segments, to a number greater than one intervening segment 20. Obviously, vehicle current collectors must be longitudinally spaced within certain predetermined minimum and maximum ranges, determined by the interval selected.

The parallelogram configuration of power segments 20 allows straddling of insulating segment 23 between power segments by current collectors 24 and 26. This prevents power interruption to the vehicles, such as could occur were a vehicle to stop with a current collector atop an insulating segment 23. Power segments 20 have ground fault interrupter type circuits to prevent short circuiting. Power segments 20 will be magnetically attractive where magnetically guided power and return trolleys are employed (as described below). Segments 20 may also be a slightly raised rail for contact with a simplified power collector system, as described below. Segments 20 may also have accompanying visual markings or radio signal transmission lines for trolley systems employing active guidance systems.

Vehicles 12a and 12b are hybrid vehicles. Referring primarily to the equivalent circuit representation 12b of the vehicle, vehicle 12b includes a battery 22 for travel off of electrified roadway 14 and current collectors (i.e. trolley) 24 and 26 for travel on the electrified roadway. Battery 22 can store energy sufficient to support minimum off electrified roadway movement, (e.g. up to 10 miles) and is recharged during periods when vehicle 12 is in contact with power rail 16. Vehicle 12 has two current collectors 24 and 26. Current collectors 24 and 26 are spaced to insure contact with a different power rail segment 20 during travel by vehicle 12 along roadway 14. The length of power segments 20 is standardized. Thus current collectors 24 and 26 must have a certain minimum spacing to avoid simultaneous contact with the same power segment. Vehicle 12 draws current through current collector 24 from an energized power segment 20 and returns the current to ground through current collector 26 to grounded power segment 20.

The equivalent circuit representation of vehicle 12b includes a traction motor (or motors) 28, battery 22, resistor 32 and switch 34. Battery 22 and traction motor 28 are connected in parallel between current collector 24 and one terminal of resistor 32. Switch 34 is connected in series between a second terminal of resistor 32 and current collector 26. Traction motor 28 drives a pair of wheels 25 of vehicle 12a in conventional manner. Battery 22 supports operation of vehicle 12b for brief periods when the vehicle is off of electrified roadway 14. Battery 22 is preferably recharged when vehicle 12 is drawing power from electrified roadway 14.

Figure 2:
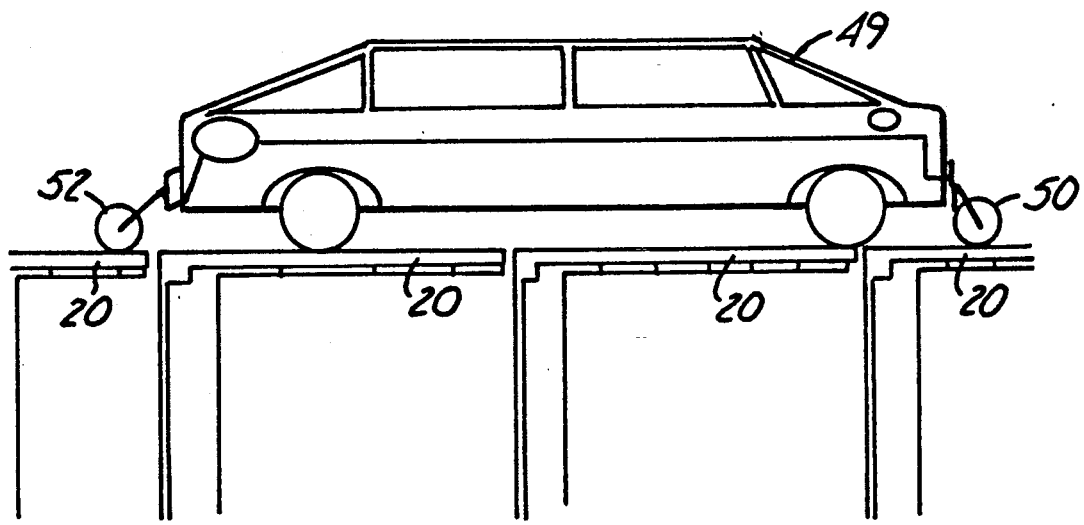
FIG. 2 is a side elevation of an electric vehicle according to one embodiment of the invention.
Figure 3:
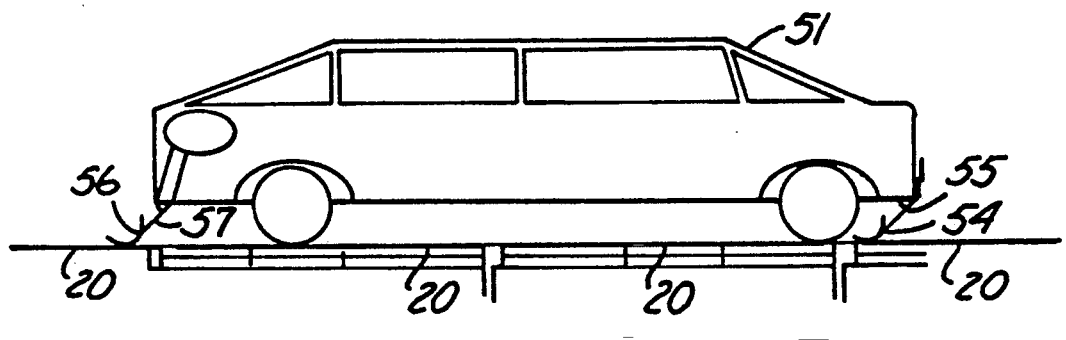
FIG. 3 is a side elevation of an electric vehicle according to a second embodiment of the invention.

FIGS. 2 and 3 illustrate alternative trolley systems for vehicle 12. Vehicle 49 has a magnetically guided, wheeled ground return trolley 50 mounted to the front end of the vehicle. A similar magnetically guided, wheeled power take up trolley 52 is mounted to the back of the vehicle. Vehicle 51 has a retractable, ground return contact 54, which spans the width of vehicle 51. Ground return contact 54 is attached to the vehicle near its front by a spring loaded strut 55, which gives upon encountering road debris. A similar, retractable, spring loaded power take contact 56 is attached to the rear of vehicle 51 by strut 57. Electrical contacts 54 and 56 can be bars or woven steel wool brushes.

Figure 4:
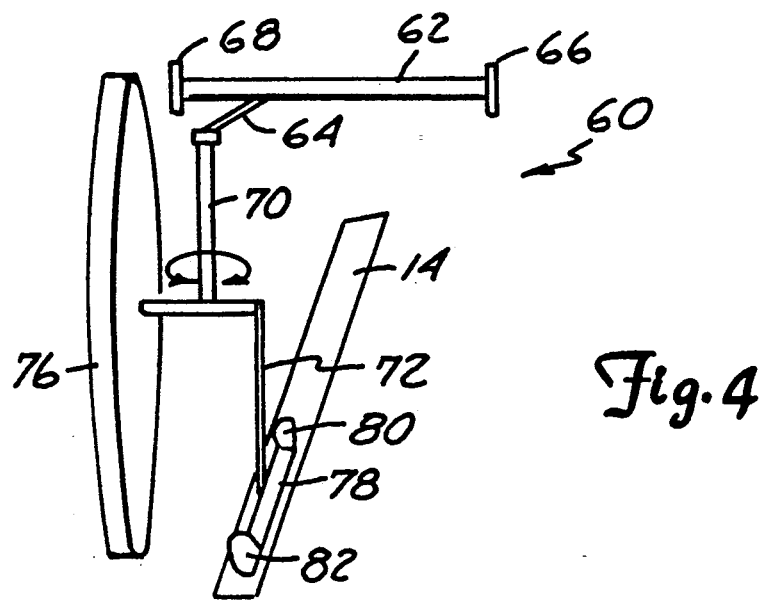
FIG. 4 is a perspective view of a trolley for use with an electric vehicle.

FIG. 4 illustrates in greater detail the magnetically guided trolley system of one embodiment of the invention. Trolley 60 is a magnetically guided trolley, actuated upon demand. Trolley 60 may be employed for either power take up or ground return. Trolley 60 is capable of lateral movement to compensate for corresponding lateral movement of the vehicle in a lane of traffic. Lateral displacement is allowed along slide bar 62 to which connector bar 64 is attached. Displacement of connector bar 64 is limited by stops 66 and 68, which are positioned at opposite ends of slide bar 62. Contact between connector bar 64 and either of stops 66 or 68 results in shut off of trolley 60. Connector bar 64 supports a swivel 70, which allows turning of a fork 72 in response to turning of a vehicle employing the trolley system. Most of the weight of trolley 60 is supported by a wheel 76, which fork 72 holds parallel to brush 78. Brush 78 is over power rail 14. Power rail 14 is made of a magnetic material, such as steel. Brush 78 is positioned at approximately road level by a tine of fork 72. Mounted with brush 78 are electromagnets 80 and 82, which may be actuated to create a magnetic field and thereby provide tracking between brush 78 and rail 14. Electromagnets 80 and 82 are turned off by contact between connector 64 and stops 66 and 68. The trolley guidance system may also be used to guide the electric vehicle, with a manual steering override system. Magnetic guidance can also be manually deactivated upon command of the operator of the electric vehicle.

Figure 5:
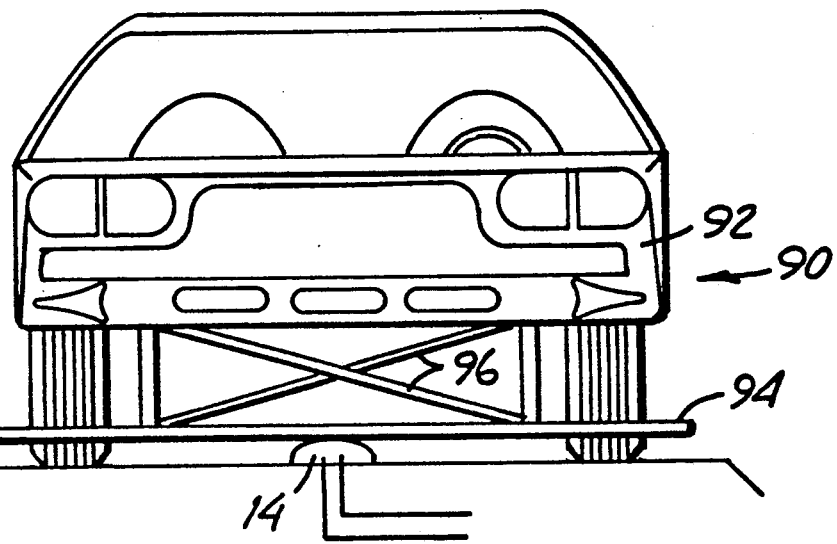
FIG. 5 is a front view of a trolley for use with and electric vehicle.

FIG. 5 illustrates an alternative embodiment of a trolley 90 mounted to a vehicle 92. With a trolley 90, a raised power rail 14 is provided. Power rail 14 can be made of any conductive material, permitting selection of materials potentially less expensive than common magnetic materials, less prone to corrosion, or of superior electrical conductivity. A bar or woven steel brush 94 is supported in contact with rail 14 by a strut 96. Strut 96 is spring loaded to bias the contact bar 94 against rail 14. Strust 96 is hinged to give if road debris is encountered and is retractable for off powered roadway use of vehicle 92. Again two trolleys are provided for each vehicle, one for power take up and a second for a ground return.

In either embodiment, the ground return trolley contacts are used to send a radio frequency (RF) signal through the ground return power segment 20 to two power controllers 38 which energize power segments 20 spaced from the current ground return segment. When the vehicle incorporating the present system is moving, the appropriate segments 20 are energized before arrival of the power take up trolley. This provides a smooth transition between the power segments by the power take up trolley, and controls switch arcing that occurs in other systems such as third rail systems. Appropriate spacing of the trolleys results in energizing the appropriate power segments, in a manner such that a complete electrical circuit between power take up and ground return trolleys and the corresponding power segments is produced.

Figure 6:
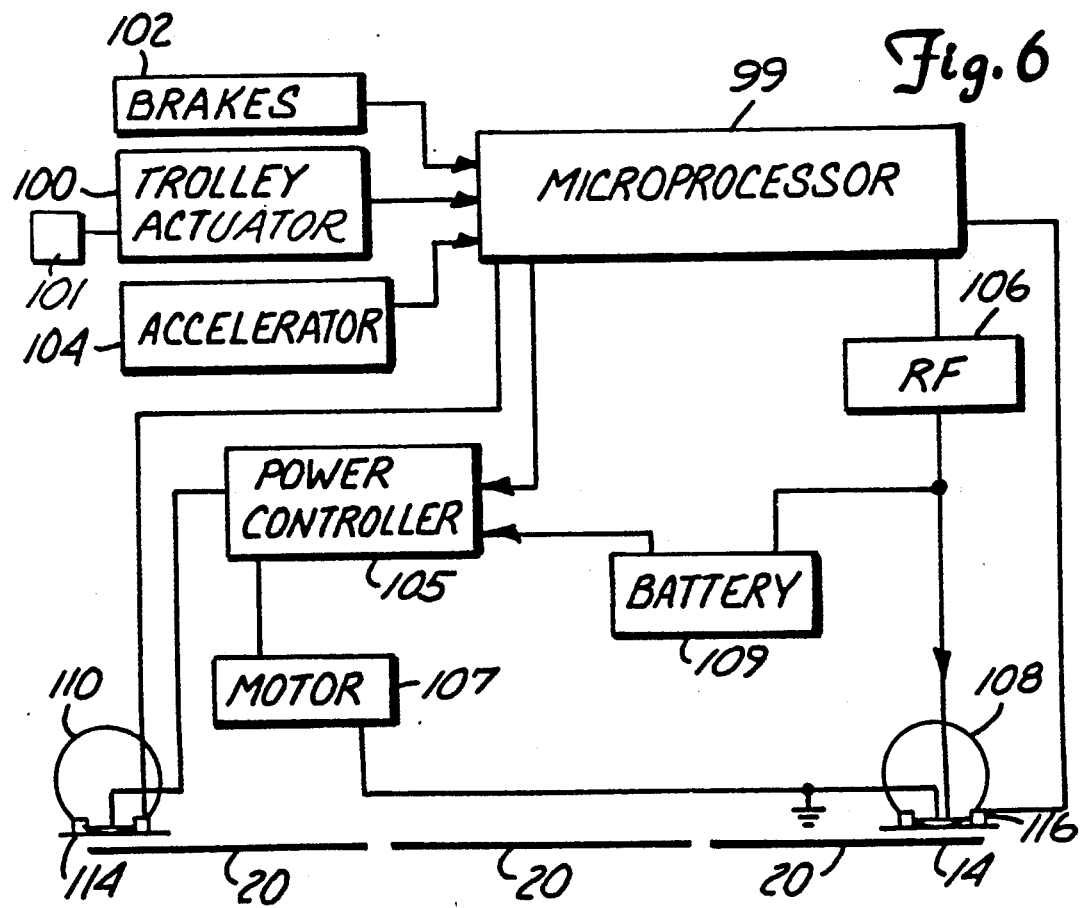
FIG. 6 is a block diagram schematic of a control arrangement for an electric vehicle.

FIG. 6 is a block diagram schematically illustrating vehicle speed and trolley control for a vehicle using D.C. power. A microprocessor 99 is responsive to a trolley actuator 100, an accelerator 104 and brakes 102 for generating selected control signals for a power controller 105 and an RF generator 106.

Trolley actuation is provided by a manually operated switch 101 connected to trolley actuator 100. When active, electromagnets, if the vehicle is so equipped, are on and when brought over a magnetic power rail 14, provide sufficient attractive force to keep trolleys 108 and 110 tracking rail 14. If the vehicle moves outside of its lane, and breaks contact with rail 14 for greater than a certain minimum period t, trolley actuation 100 automatically turns off. The operator may also manually switch off both trolleys. Microprocessor 99 controls transmission of actuation signals to electromagnets 114 and 116. Electromagnets 114 and 116 may be on while no power is being drawn by the vehicle.

Brake actuation 102 or letting up on accelerator actuation 104 results in cutting off of the RF signal actuator 106, which otherwise provides the signal for transmission to the grounded trolley 108 and rail 14. Accelerator 104 provides a power demand indication to microprocessor 99 which in turn provides an appropriate control signal to power controller 105.

Power controller 105 controls power source switching to motor 107, allowing the motor to draw energization from either battery 109 or power take up trolley 110. Motor 107 is preferably a D.C. motor, and accordingly, its level of energization is easily controlled through power controller 105 as well.

Although the present invention has been described with reference to preferred embodiments, workers skilled in the art will recognize that changes may be made in form and detail without departing from the spirit and scope of the invention.

What is claimed is:

1. An electric vehicle transportation system comprising:
   an electric power rail extending longitudinally along a vehicular route, the power rail including a plurality of longitudinally aligned, mutually electrically isolated segments;
   an electric vehicle drawing power from one segment of the power rail and providing an actuation signal to another segment of the power rail which is longitudinally spaced from the first segment;
   a power bus;
   power switching means associated with each electrically isolated segment for selectively connecting the associated isolated segment either to the power bus or to a reference voltage level; and
   energization selection means associated with each power switching means for selectively connecting its associated segment to the power bus upon application of an actuation signal to another longitudinally spaced segment.

2. An electric vehicle transportation system such as that set forth in claim 1, wherein an electric vehicle further comprises:
   a ground return trolley;
   a power take up trolley;
   means for applying an actuation signal to the ground return trolley for transmission to the power rail; and
   the ground return trolley and the power take up trolley being longitudinally spaced from one another in the direction of travel of the vehicle along the roadway, such that the power take up trolley is in contact with a first isolated segment and the ground return trolley is in contact with a second, separate isolated segment, the first isolated segment being energized in response to application of the actuation signal to the power second isolated segment in contact with the ground return trolley.

3. An electric vehicle transportation system such as that set forth in claim 2, and further comprising:
   means connected to each isolated segment for transmitting an actuation signal applied to an isolated segment to power switching means for second and third isolated segments longitudinally displaced by a predetermined interval from the first segment.

4. An electric vehicle transportation system such as that set forth in claim 3, wherein an electric power rail further comprises, the longitudinally aligned rail portions having edges canted with respect to the direction of elongation of the rail, the edges between adjacent rail portions being parallel to one another.

5. An electric vehicle transportation system such as that set forth in claim 4, wherein the power take up trolley and the ground return trolley each further comprise electrical contact means for contacting the power rail and for bridging the gap between adjacent isolated segments of the power rail when brought adjacent to such a gap.

6. An electric vehicle transportation system such as that set forth in claim 5, wherein the power take up trolley and the ground return trolley each further comprise a self steering trolley guided by electromagnets holding the electrical contact means in contact with the power rail.

7. An electric vehicle transportation system such as that set forth in claim 5, wherein the power rail is set on a roadway having a load-bearing surface.

8. An electric vehicle transportation system such as that set forth in claim 7, wherein the power take up trolley and the ground return trolley each further comprise:
   a conductor elongated in a direction perpendicular to the direction of travel of the vehicle;
   retractable strut means for supporting the conductor at a position substantially adjacent the load bearing surface; and
   spring means for biasing the conductor against the power rail.

9. An electric vehicle transportation system such as that set forth in claim 8, wherein an upper surface of the power rail is raised slightly above the level of the load bearing surface.

10. An electric vehicle transportation system, comprising:
    a roadway having a load bearing surface;
    an electric power rail extending longitudinally on the roadway and supported on the load bearing surface;
    the power rail being segmented into a plurality of longitudinally aligned, mutually isolated electrically conductive segments;
    electric vehicles having longitudinally spaced trolleys for contacting the power rail on different segments of the power rail and including means for applying energization actuation signals to one of those segments;
    a power bus for energizing selected segments of the power rail;

power switching controllers associated with each of the electrically isolated segments of the power rail;

the power switching controllers being responsive to energization actuation signals applied to a longitudinally displaced segment of the power rail for connecting their associated segments to the power bus.

11. An electric vehicle transportation system such as that set forth in claim 10, wherein an electric vehicle further comprises:

a ground return trolley;

a power take up trolley;

means for applying an actuation signal to the ground return trolley for transmission to a segment of the power rail; and the ground return trolley and the power take up trolley being longitudinally spaced from one another in the direction of travel of the vehicle along the roadway, such that the power take up trolley is in contact with a first isolated segment of the power rail energized as a result of an actuation signal applied to a segment of the power rail in contact with the ground return trolley.

12. An electric vehicle transportation system such as that set forth in claim 11, and further comprising:

means connected to each isolated segment of the power rail for transmitting an actuation signal applied to the respective segment to power switching means for second and third segments longitudinally displaced by a predetermined interval from the respective segment.

13. An electric vehicle transportation system such as that set forth in claim 12, wherein an electric power rail further comprises, the longitudinally aligned rail segments having edges canted with respect to the direction of elongation of the rail, the edges between adjacent rail segments being parallel to one another.

14. An electric vehicle transportation system such as that set forth in claim 13, wherein the power take up trolley and the ground return trolley each further comprise electrical contact means for contacting the power rail and for bridging the gap between adjacent segments of the power rail when brought adjacent to such a gap.

15. An electric vehicle transportation system such as that set forth in claim 14, wherein the power take up trolley and the ground return trolley each further comprise a self steering trolley guided by electromagnets holding the electrical contact means in contact with the power rail.

16. An electric vehicle transportation system such as that set forth in claim 14, wherein the power take up trolley and the ground return trolley each further comprise:

a conductor elongated in a direction perpendicular to the direction of travel of the vehicle;

retractable strut means for supporting the conductor at a position substantially adjacent the load bearing surface; and spring means for biasing the conductor against the power rail.

17. An electric vehicle transportation system such as that set forth in claim 16, wherein an upper surface of the power rail is slightly above the level of the load bearing surface.

18. An electric vehicle transportation system, comprising:

a roadway having a load bearing surface;

an electric power rail extending longitudinally on the roadway and having a default electrical potential level;

means for energizing selected portions of the power rail at a second potential level upon application of an actuation signal to the power rail; and an electric vehicle adapted for operation on the roadway by having a power take up and a return trolley, the trolleys being longitudinally spaced from one another by a predetermined interval such that the return trolley is in electrical contact with a portion of the power rail at the default potential level and the power take-up trolley is in electrical contact with the portion of the power rail energized at the second potential level.

19. An electric vehicle transportation system such as that set forth in claim 18, wherein the power take up trolley and the ground return trolley each further comprise a self steering trolley guided by electromagnets and electrical contact means held in contact with the power rail by the electromagnets.

20. An electrical vehicle transportation system such as that set forth in claim 18, wherein the power take up trolley and the ground return trolley each further comprise:

a bar or brush conductor elongated in a direction perpendicular to the direction of travel of the vehicle;

retractable strut means for supporting the conductor at a position substantially adjacent the load bearing surface; and spring means for biasing the conductor against the power rail.

21. An electric vehicle transportation system such as that set forth in claim 20, wherein the power rail is raised slightly above the level of the load bearing surface.

* * * * *

UNITED STATES PATENT AND TRADEMARK OFFICE
CERTIFICATE OF CORRECTION

PATENT NO. : 5,045,646

DATED : September 3, 1991

INVENTOR(S) : Nicholas R. Musachio

It is certified that error appears in the above-identified patent and that said Letters Patent is hereby corrected as shown below:

Col. 8, line 7, delete "power".

Signed and Sealed this

Twenty-third Day of February, 1993

Attest:

STEPHEN G. KUNIN

Attesting Officer     Acting Commissioner of Patents and Trademarks